US012671564B2

(12) United States Patent
Nomura et al.

(10) Patent No.: US 12,671,564 B2
(45) Date of Patent: Jun. 30, 2026

(54) VEHICLE ELECTRONIC SYSTEM, CONTROL METHOD, RELAY DEVICE, AND RECORDING MEDIUM

(71) Applicant: HONDA MOTOR CO., LTD., Tokyp (JP)

(72) Inventors: Takumi Nomura, Tokyo (JP); Tatsuroh Saitoh, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 310 days.

(21) Appl. No.: 18/455,891

(22) Filed: Aug. 25, 2023

(65) Prior Publication Data

US 2024/0106620 A1    Mar. 28, 2024

(30) Foreign Application Priority Data

Sep. 28, 2022    (JP) ................................. 2022-155133

(51) Int. Cl.
*H04L 7/00*        (2006.01)
*H04L 12/40*       (2006.01)

(52) U.S. Cl.
CPC ............ *H04L 7/0008* (2013.01); *H04L 12/40* (2013.01); *H04L 2012/40273* (2013.01)

(58) Field of Classification Search
CPC .................................................... H04L 7/0008
See application file for complete search history.

(56) References Cited

U.S. PATENT DOCUMENTS

| | | | | |
|---|---|---|---|---|
| 5,027,297 A * | 6/1991 | Garitty | ................... | G04G 99/00 |
| | | | | 700/286 |
| 8,255,109 B2 * | 8/2012 | Isoyama | ............. | H04L 12/4625 |
| | | | | 701/29.1 |
| 2015/0003443 A1 | 1/2015 | Koenigseder et al. | | |
| 2017/0366287 A1 * | 12/2017 | Zeng | ...................... | H04J 3/0667 |
| 2019/0069257 A1 * | 2/2019 | Iwakiri | ................. | G07C 5/008 |
| 2020/0007424 A1 * | 1/2020 | Mihelic | ................. | H04J 3/0667 |
| 2023/0388097 A1 * | 11/2023 | Yamada | ................. | H04L 12/28 |

FOREIGN PATENT DOCUMENTS

| | | | |
|---|---|---|---|
| JP | 2005-004529 A | | 1/2005 |
| JP | 2014190735 A | * | 10/2014 |
| JP | 2017005617 | * | 1/2017 |

(Continued)

OTHER PUBLICATIONS

Japanese Office Action dated Jul. 30, 2024, Application No. 2022-155133; English machine translation included, 9 pages.

(Continued)

*Primary Examiner* — Abdeltif Ajid

(74) *Attorney, Agent, or Firm* — Rankin, Hill & Clark LLP

(57) ABSTRACT

Provided is a vehicle electronic system that includes: a first electronic device connected to a first communication network of a first communication standard; a second electronic device connected to a second communication network of a second communication standard; and a relay device connected to the first communication network and the second communication network. The relay device includes a relay device transmission unit that transmits, to the second electronic device, first time information indicating time synchronized in the first communication network.

9 Claims, 8 Drawing Sheets

(56)          References Cited

FOREIGN PATENT DOCUMENTS

| | | | | |
|----|----|----|----|----|
| JP | 2017005617 | A | * | 1/2017 |
| JP | 2019-047163 | A | | 3/2019 |
| JP | 2021100180 | A | * | 7/2021 |
| WO | WO-2023243401 | A1 | * 12/2023 | ........... H04L 43/106 |

OTHER PUBLICATIONS

Yokote et al, Technology Reports 3.5GHz band introduction, NTT Docomo Technical Journal, vol. 24, No. 2 [online], The Telecommunications Association, Year: 2016, p. 18-26.

* cited by examiner

FIG.2

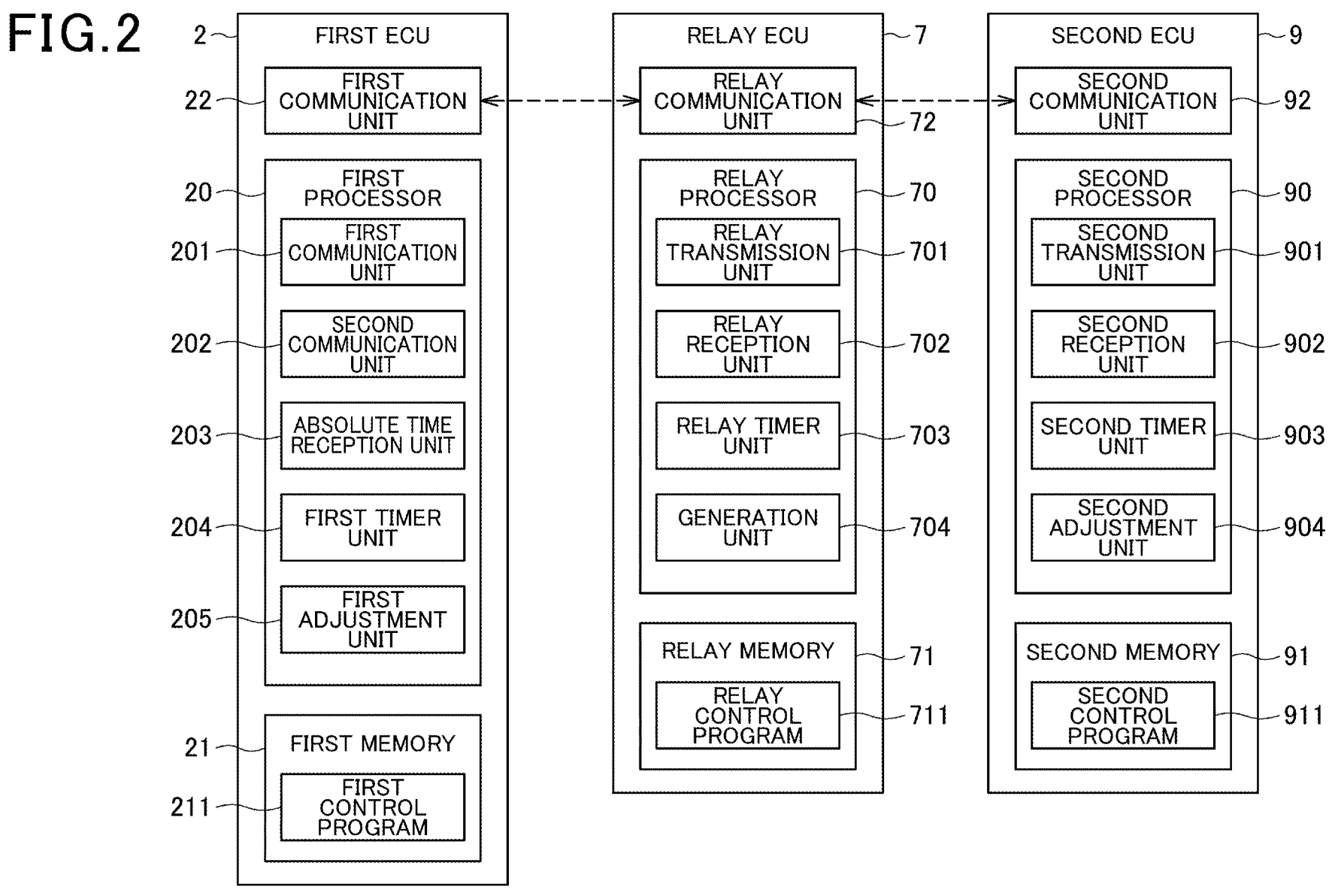

SECOND ECU (9)

- SECOND COMMUNICATION UNIT (92)
- SECOND PROCESSOR (90)
  - SECOND TRANSMISSION UNIT (901)
  - SECOND RECEPTION UNIT (902)
  - SECOND TIMER UNIT (903)
  - SECOND ADJUSTMENT UNIT (904)
- SECOND MEMORY (91)
  - SECOND CONTROL PROGRAM (911)

RELAY ECU (7)

- RELAY COMMUNICATION UNIT (72)
- RELAY PROCESSOR (70)
  - RELAY TRANSMISSION UNIT (701)
  - RELAY RECEPTION UNIT (702)
  - RELAY TIMER UNIT (703)
  - GENERATION UNIT (704)
- RELAY MEMORY (71)
  - RELAY CONTROL PROGRAM (711)

FIRST ECU (2)

- FIRST COMMUNICATION UNIT (22)
- FIRST PROCESSOR (20)
  - FIRST COMMUNICATION UNIT (201)
  - SECOND COMMUNICATION UNIT (202)
  - ABSOLUTE TIME RECEPTION UNIT (203)
  - FIRST TIMER UNIT (204)
  - FIRST ADJUSTMENT UNIT (205)
- FIRST MEMORY (21)
  - FIRST CONTROL PROGRAM (211)

FIG.6

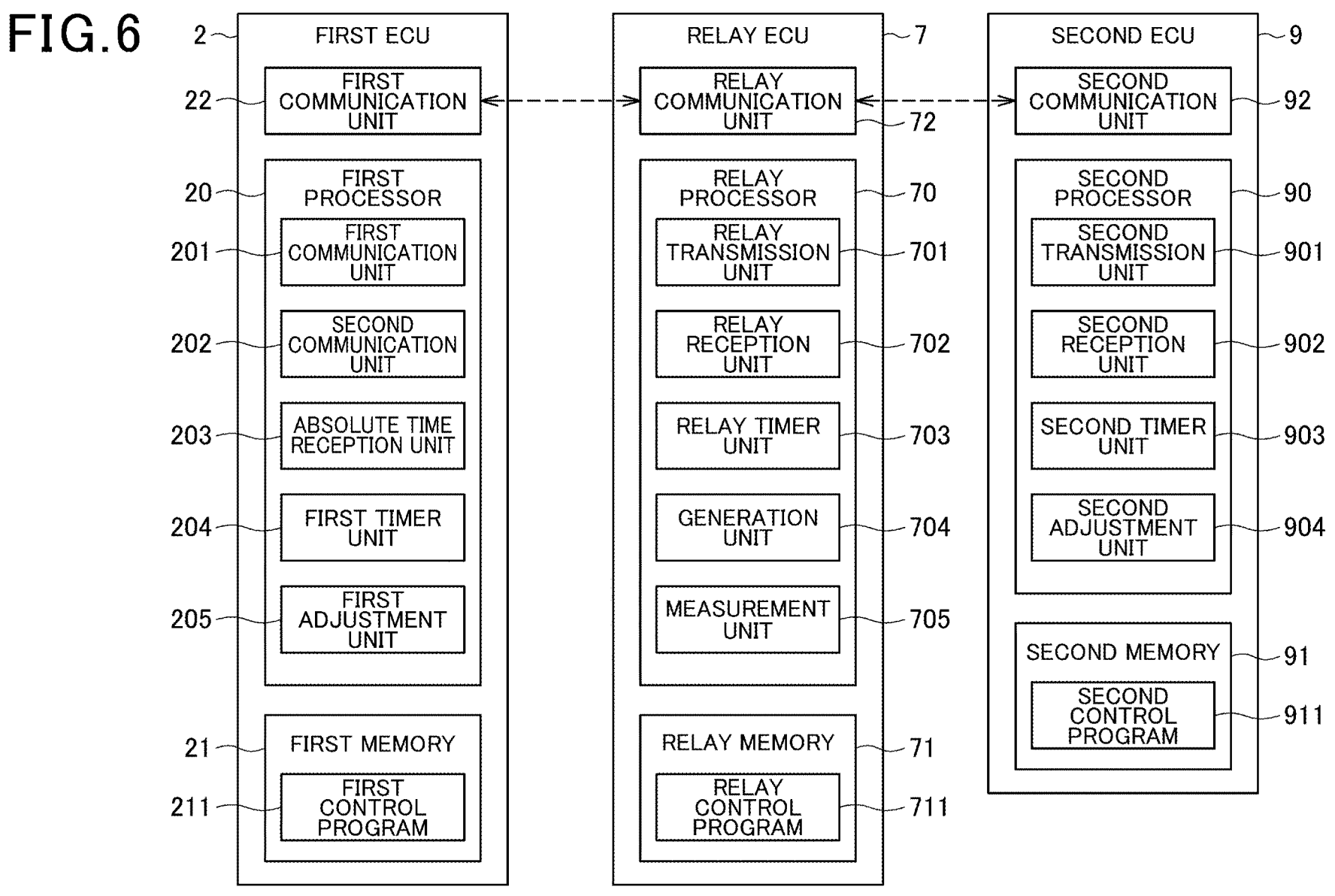

SECOND ECU — 9

- SECOND COMMUNICATION UNIT — 92
- SECOND PROCESSOR — 90
  - SECOND TRANSMISSION UNIT — 901
  - SECOND RECEPTION UNIT — 902
  - SECOND TIMER UNIT — 903
  - SECOND ADJUSTMENT UNIT — 904
- SECOND MEMORY — 91
  - SECOND CONTROL PROGRAM — 911

RELAY ECU — 7

- RELAY COMMUNICATION UNIT — 72
- RELAY PROCESSOR — 70
  - RELAY TRANSMISSION UNIT — 701
  - RELAY RECEPTION UNIT — 702
  - RELAY TIMER UNIT — 703
  - GENERATION UNIT — 704
  - MEASUREMENT UNIT — 705
- RELAY MEMORY — 71
  - RELAY CONTROL PROGRAM — 711

FIRST ECU — 2

- FIRST COMMUNICATION UNIT — 22
- FIRST PROCESSOR — 20
  - FIRST COMMUNICATION UNIT — 201
  - SECOND COMMUNICATION UNIT — 202
  - ABSOLUTE TIME RECEPTION UNIT — 203
  - FIRST TIMER UNIT — 204
  - FIRST ADJUSTMENT UNIT — 205
- FIRST MEMORY — 21
  - FIRST CONTROL PROGRAM — 211

VEHICLE ELECTRONIC SYSTEM, CONTROL METHOD, RELAY DEVICE, AND RECORDING MEDIUM

INCORPORATION BY REFERENCE

The present application claims priority under 35 U.S.C. § 119 to Japanese Patent Application No. 2022-155133 filed on Sep. 28, 2022. The content of the application is incorporated herein by reference in its entirety.

BACKGROUND OF THE INVENTION

Field of the Invention

The present invention relates to a vehicle electronic system, a control method, a relay device, and a recording medium of the vehicle electronic system.

Description of the Related Art

Conventionally, there is known a relay device that is connected to a communication network of prescribed communication standards. For example, Japanese Patent Laid-Open No. 2019-47163 discloses a relay device connected to an in-vehicle LAN using Ethernet (registered trademark).

By the way, there may be cases where the relay device as disclosed in Japanese Patent Laid-Open No. 2019-47163 is connected to a plurality of communication networks of different communication standards. In such cases, there is a need for implementing time synchronization between electronic devices that are connected to communication networks of different communication standards. However, conventionally, there has been no mechanism for meeting such need.

The present invention is designed in view of the aforementioned circumstance, and it is an object thereof to enable time synchronization between electronic devices that are connected to communication networks of different communication standards.

SUMMARY OF THE INVENTION

One aspect of the present invention is a vehicle electronic system that includes: a first electronic device connected to a first communication network of a first communication standard; a second electronic device connected to a second communication network of a second communication standard; and a relay device connected to the first communication network and the second communication network, in which the relay device includes a relay device transmission unit that transmits, to the second electronic device, first time information indicating time synchronized in the first communication network.

Advantageous Effect of Invention

According to one aspect of the present invention, it is possible to implement time synchronization between electronic devices that are connected to communication networks of different communication standards.

BRIEF DESCRIPTION OF THE DRAWINGS

FIG. 2 is a block diagram showing configurations of a first ECU, a relay ECU, and a second ECU;

FIG. 6 is a block diagram showing the configurations of the first ECU, the relay ECU, and the second ECU;

DETAILED DESCRIPTION OF THE PREFERRED EMBODIMENTS

1. First Embodiment

First, a first embodiment will be described.

Figure 1:
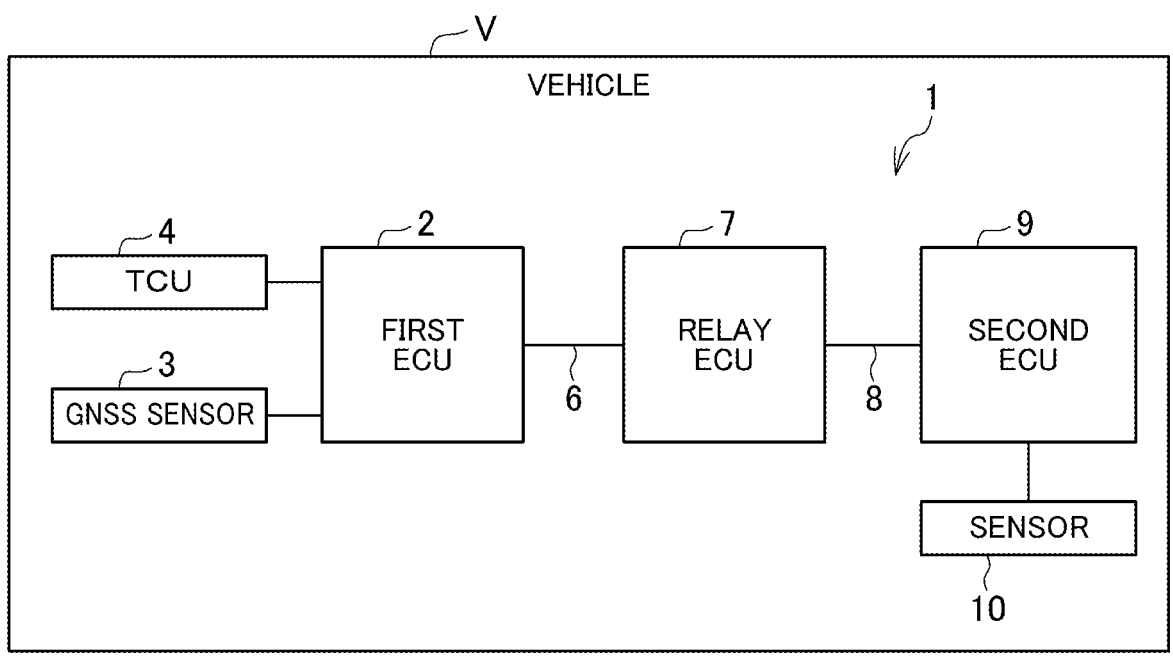
FIG. 1 is a diagram showing a configuration of a vehicle electronic system.

FIG. 1 is a diagram showing the configuration of a vehicle electronic system 1.

The vehicle electronic system 1 is a system that is applied to a vehicle V. The vehicle electronic system 1 includes ECUs (Electronic Control Units) loaded on the vehicle V. The vehicle electronic system 1 may function as a system that controls the vehicle V.

The vehicle electronic system 1 includes a first ECU 2. The first ECU 2 is connected to a GNSS (Global Navigation Satellite System) sensor 3 and a TCU (Telematics Control Unit) 4. A relay ECU 7 is connected to the first ECU 2 via a first communication network 6. The first communication network 6 is a communication network of Ethernet standard.

The first ECU 2 corresponds to a "first electronic device" of the present disclosure. The relay ECU 7 corresponds to a "relay device" of the present disclosure. The Ethernet standard corresponds to a "first communication standard" of the present disclosure.

The relay ECU 7 relays transmission/reception of data between the first ECU 2 and a second ECU 9. The relay ECU 7 is time-synchronized with the first ECU 2. The relay ECU 7 and the first ECU 2 are time-synchronized by a gPTP (generalized Precision Time Protocol) synchronization method defined in IEEE 802.1AS, for example. To the relay ECU 7, the first communication network 6 and a second communication network 8 are connected. The second communication network 8 is a communication network of CAN standard. The second ECU 9 is connected to the second communication network 8.

The second ECU 9 corresponds to a "second electronic device" of the present disclosure. The CAN standard corresponds to a "second communication standard" of the present disclosure.

The second ECU 9 is an ECU that controls devices such as a sensor 10 like a speed sensor, a V2X (Vehicle to Everything) communication device, and the like, for example. In the present embodiment, presented as an example is a case where the sensor 10 is connected to the second ECU 9, and the second ECU 9 controls the sensor 10.

FIG. 2 is a block diagram showing the configurations of the first ECU 2, the relay ECU 7, and the second ECU 9.

The first ECU 2 includes a first processor 20 such as a CPU (Central Processing Unit), a first memory 21, and a first communication unit 22.

The first memory 21 is a storage device that stores programs and data executed by the first processor 20. The first memory 21 is configured with a nonvolatile storage device such as a ROM (Read Only Memory), for example. The first memory 21 may also include a volatile storage device configuring a work area of the first processor 20, such as a RAM (Random Access memory), for example. The first memory 21 stores data to be processed by the first processor 20, and a first control program 211 to be executed by the first processor 20.

The first communication unit 22 includes hardware such as a communication circuit and a connector complying with the CAN standard, and communicates with the relay ECU 7 under control of the first processor 20. A first communication bus 6 is connected to the first communication unit 22.

The first processor 20 functions as a first communication unit 201, a second communication unit 202, an absolute time reception unit 203, a first timer unit 204, and a first adjustment unit 205 by reading out and executing the first control program 211 stored in the first memory 21.

The first communication unit 201 communicates with the relay ECU 7 via the first communication unit 22.

The second communication unit 202 communicates with a sever device, not shown, via the TCU 4.

The absolute time reception unit 203 receives absolute time information from the GNSS sensor 3. The absolute time information indicates absolute time. Absolute time is a time expressed as formal elapsed seconds from a prescribed time in Coordinated Universal Time (UTC) (from the substantial elapsed seconds, leap seconds inserted therein are subtracted, and removed elapsed seconds are added), and refers to a time that can be shared with high precision.

The first timer unit 204 counts the time. For example, the first timer unit 204 operates as an RTC (Real Time Clock), and counts the current time. The time counted by the first timer unit 204 is adjusted by the first adjustment unit 205.

The first adjustment unit 205 adjusts the time counted by the first timer unit 204. When the absolute time reception unit 203 receives the absolute time information, the first adjustment unit 205 adjusts the time counted by the first timer unit 204 to the absolute time that is indicated in the absolute time information received.

The relay ECU 7 includes a relay processor 70 such as a CPU, a relay memory 71, and a relay communication unit 72.

The relay processor 70 corresponds to a "processor" of the present disclosure.

The relay memory 71 is a storage device that stores programs and data executed by the relay processor 70. The relay memory 71 is configured with a nonvolatile storage device such as a ROM, for example. The relay memory 71 may also include a volatile storage device configuring a work area of the relay processor 70, such as a RAM, for example. The relay memory 71 stores data to be processed by the relay processor 70, and a relay control program 711 to be executed by the relay processor 70.

The relay control program 711 corresponds to a "program" of the present disclosure.

The relay communication unit 72 includes hardware such as a communication circuit and a connector complying with the Ethernet standard, and communicates with the second ECU 9 under control of the relay processor 70. Furthermore, the relay communication unit 72 includes hardware such as a communication circuit and a connector complying with the CAN standard, and communicates with the second ECU 9 under control of the relay processor 70.

The relay processor 70 functions as a relay transmission unit 701, a relay reception unit 702, a relay timer unit 703, and a generation unit 704 by reading out and executing the relay control program 711 stored in the relay memory 71.

The relay transmission unit 701 corresponds to a "relay device transmission unit" of the present disclosure. The relay reception unit 702 corresponds to a "relay device reception unit" of the present disclosure.

The relay transmission unit 701 transmits information to the first ECU 2 and the second ECU 9 via the relay communication unit 72.

The relay reception unit 702 receives information from the first ECU 2 and the second ECU 9 via the relay communication unit 72.

The relay timer unit 703 counts the time. As described above, the relay ECU 7 and the first ECU 2 are time-synchronized by a gPTP synchronization method, for example. Therefore, the time counted by the relay timer unit 703 is synchronized with the time counted by the first timer unit 204.

The generation unit 704 generates first time information J1 that indicates the time counted by the relay timer unit 703. The generation unit 704 outputs the first time information J1 generated to the relay transmission unit 701.

The second ECU 9 includes a second processor 90 such as a CPU, a second memory 91, and a second communication unit 92.

The second memory 91 is a storage device that stores programs and data executed by the second processor 90. The second memory 91 is configured with a nonvolatile storage device such as a ROM, for example. The second memory 91 may also include a volatile storage device configuring a work area of the second processor 90, such as a RAM, for example. The second memory 91 stores data to be processed by the second processor 90, and a second control program 911 to be executed by the second processor 90.

The second communication unit 92 includes hardware such as a communication circuit and a connector complying with the CAN standard, and communicates with the relay ECU 7 under control of the second processor 90.

The second processor 90 functions as a second transmission unit 901, a second reception unit 902, a second timer unit 903, and a second adjustment unit 904 by reading out and executing the second control program 911 stored in the second memory 91.

The second transmission unit 901 corresponds to a "second electronic device transmission unit" of the present disclosure. The second reception unit 902 corresponds to a "second electronic device reception unit" of the present disclosure. The second timer unit 903 corresponds to a "second electronic device timer unit" of the present disclosure.

The second transmission unit 901 transmits information to the relay ECU 7 via the second communication unit 92.

The second reception unit 902 receives information from the relay ECU 7 via the second communication unit 92.

The second timer unit 903 counts the time. For example, the second timer unit 903 operates as an RTC, and counts the time. The time counted by the second timer unit 903 is adjusted by the second adjustment unit 904.

The second adjustment unit 904 adjusts the time counted by the second timer unit 903.

Next, operations of the vehicle electronic system 1 according to the present embodiment will be described.

Figure 3:
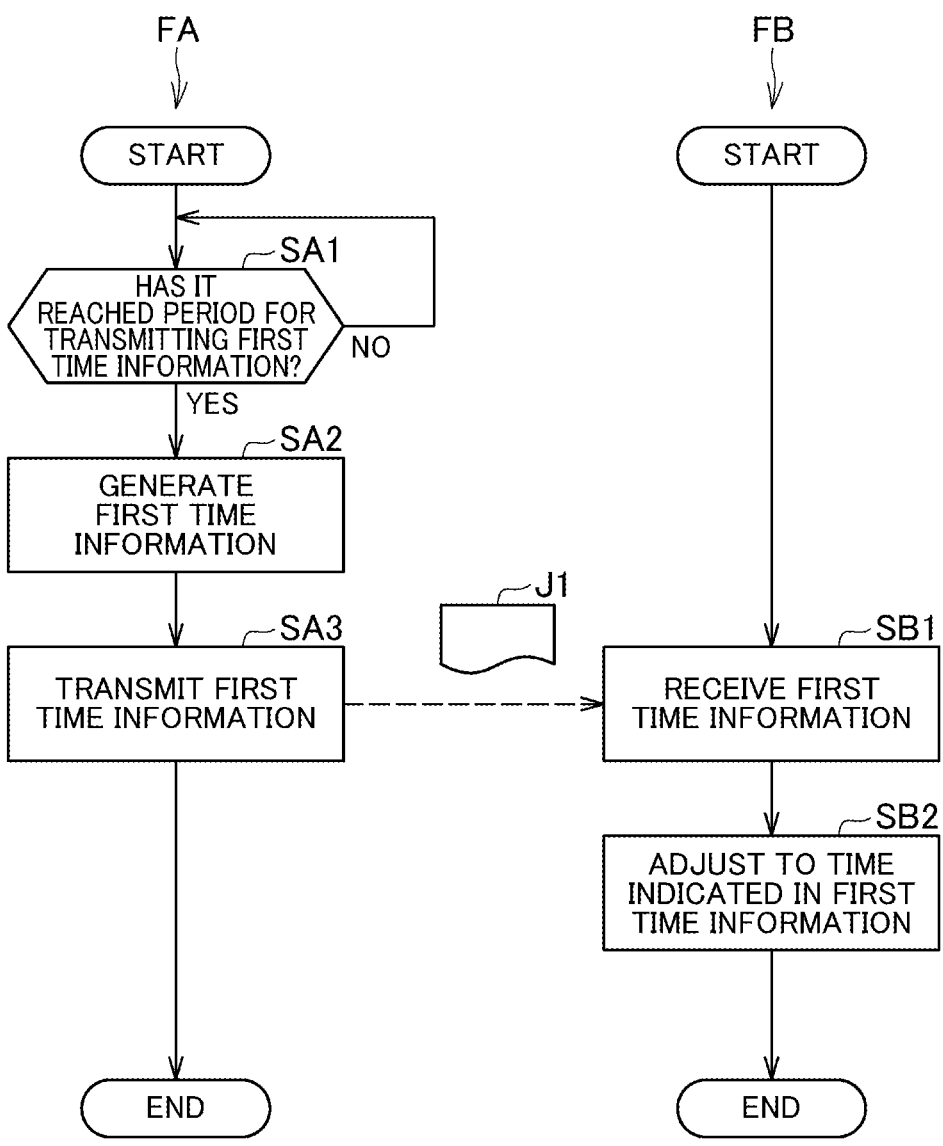
FIG. 3 is a flowchart showing operations of the relay ECU and the second ECU.

FIG. 3 is a flowchart showing the operations of the relay ECU 7 and the second ECU 9. Operations shown in FIG. 3 are operations related to time synchronization. In FIG. 3, a flowchart FA indicates the operations of the relay ECU 7, and a flowchart FB indicates the operations of the second ECU 9.

As indicated in the flowchart FA, the generation unit 704 determines whether it has reached a period for transmitting the first time information J1 (Step SA1).

When determined that it has not reached the period for transmitting the first time information J1 (NO in Step SA1), the generation unit 704 performs determination of Step SA1 again.

In the meantime, when determined that it has reached the period for transmitting the first time information J1 (Yes in Step SA1), the generation unit 704 generates the first time information J1 (Step SA2). The first time information J1 generated in Step SA2 indicates the time counted by the relay timer unit 703 at the point where generation of the first time information J1 is started.

Then, the relay transmission unit 701 transmits the first time information J1 generated by the generation unit 704 to the second ECU 9 (Step SA3).

As indicated in the flowchart FB, the second reception unit 902 receives the first time information J1 from the relay ECU 7 (Step SB1).

Then, the second adjustment unit 904 adjusts the time counted by the second timer unit 903 to the time indicated in the first time information J1 received in Step SB1 (Step SB2). After the adjustment performed in Step SB2, the second timer unit 903 counts the time from the time indicated in the first time information J1 received in Step SB1 as the basis.

By the operations shown in FIG. 3, the second ECU 9 can synchronize the time to be counted with the absolute time. Therefore, the time counted by each of the ECUs provided in the vehicle electronic system 1 can be synchronized with the absolute time.

Figure 4:
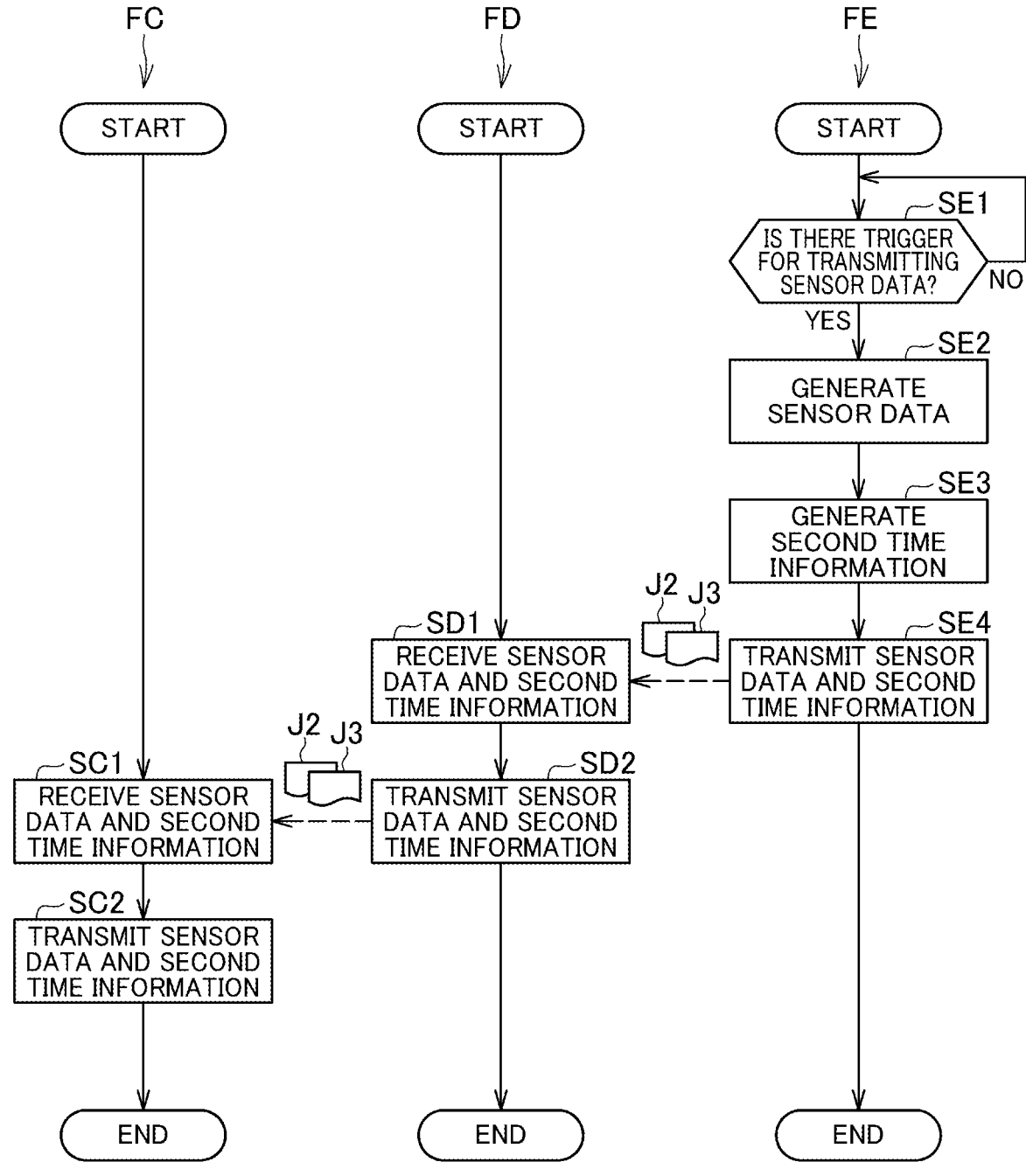
FIG. 4 is a flowchart showing operations of the first ECU, the relay ECU, and the second ECU.

FIG. 4 is a flowchart showing the operations of the first ECU 2, the relay ECU 7, and the second ECU 9. The operations shown in FIG. 4 are operations when the second ECU 9 transmits the detection value of the sensor 10 controlled thereby to the outside of the vehicle V. In FIG. 4, a flowchart FC indicates the operations of the first ECU 2, a flowchart FD indicates the operations of the relay ECU 7, and a flowchart FE indicates the operations of the second ECU 9.

As indicated in the flowchart FE, the second transmission unit 901 determines whether there is a trigger for transmitting sensor data J2 (Step SE1). The sensor data J2 is data that contains the detection value of the sensor 10. An example of the trigger for transmitting the sensor data J2 may be that it has received the detection value from the sensor 10.

The sensor data J2 corresponds to "data" of the present disclosure.

When determined that there is no such trigger for transmitting the sensor data J2 (NO in Step SE1), the second transmission unit 901 performs determination of Step SE1 again.

In the meantime, when determined that there is a trigger for transmitting the sensor data J2 (Yes in Step SE1), the second transmission unit 901 generates the sensor data J2 (Step SE2).

Then, the second transmission unit 901 generates second time information J3 indicating the time counted by the second timer unit 903 (Step SE3). The second time information J3 generated in Step SE3 indicates the time counted by the second timer unit 903 at the point where generation of the second time information J3 is started.

Thereafter, the second transmission unit 901 adds the second time information J3 generated in Step SE3 to the sensor data J2 generated in Step SE2, and transmits the sensor data J2 to which the second time information J3 is added, to the relay ECU 7 (Step SE4).

As indicated in the flowchart FD, the relay reception unit 702 receives, from the second ECU 9, the sensor data J2 to which the second time information J3 is added (Step SD1).

Then, the relay transmission unit 701 transmits, to the first ECU 2, the sensor data J2 with the added second time information J3 received in Step SD1 (Step SD2).

As indicated in the flowchart FC, the first communication unit 201 receives, from the relay ECU 7, the sensor data J2 with the added second time information J3 (Step SC1).

Then, the second communication unit 202 transmits, to the outside of the vehicle V, the sensor data J2 with the added second time information J3 received in Step SC1 (Step SC2).

By the operations shown in FIG. 4, the reception side of the sensor data J2 can determine at what time the detection value of the sensor 10 indicated in the sensor data J2 is detected. This makes it possible to transmit, to the external device of the vehicle V, the sensor data J2 that can be easily used by the external device of the vehicle V. As examples of the external device of the vehicle V, there may be a collection server that collects information from the vehicle V, and an analysis server that analyzes information received from the vehicle V.

2. Second Embodiment

Next, a second embodiment will be described.

In the description of the second embodiment, same reference signs are applied to the structural elements that are same as those of each unit of the vehicle electronic system 1 according to the first embodiment, and detailed explanations thereof are omitted as appropriate.

In the first embodiment described above, the relay ECU 7 transmits the first time information J1 to the second ECU 9 every time it reaches a prescribed period. In the second embodiment, the relay ECU 7 starts transmission of the first time information J1, when the relay ECU 7 receives, via the first ECU 2, first request information from the external device of the vehicle V. The first request information is information for requesting to add the time information to the sensor data J2. Furthermore, in the second embodiment, the relay ECU 7 stops transmission of the first time information J1, when the relay ECU 7 receives, via the first ECU 2, second request information from the external device of the vehicle V. The second request information is information for requesting to stop adding the time information to the sensor data J2.

The first request information corresponds to "request information" of the present disclosure.

Operations of the vehicle electronic system 1 according to the second embodiment will be described.

Figure 5:
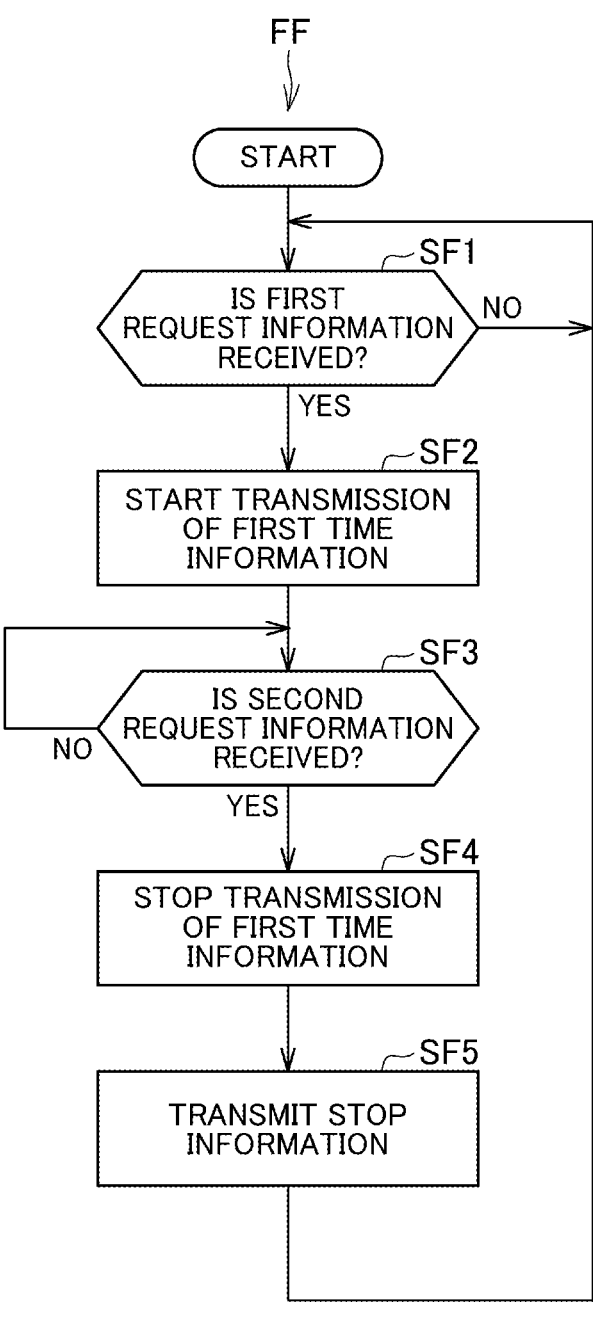
FIG. 5 is a flowchart showing operations of the relay ECU.

FIG. 5 is a flowchart FF indicating the operations of the relay ECU 7.

The relay reception unit 702 determines whether the first request information is received from the first ECU 2 (Step SF1).

When determined that the first request information is not received from the first ECU 2 (NO in Step SF1), the relay reception unit 702 performs determination of Step SF1 again.

When the relay reception unit 702 determines that the first request information is received from the first ECU 2 (YES in Step SF1), the relay transmission unit 701 starts transmission of the first time information J1 (Step SF2).

When reception of the first time information J1 is started, the second ECU 9 adjusts the time counted by the second timer unit 903 to the time indicated in the first time information J1 received, as in the case of the first embodiment. Furthermore, when reception of the first time information J1 is started, the second ECU 9 starts transmission of the sensor data J2 with the added second time information J3, as in the case of the first embodiment.

Then, the relay reception unit 702 determines whether the second request information is received (Step SF3).

When determined that the second request information is not received from the first ECU 2 (NO in Step SF3), the relay reception unit 702 performs determination of Step SF3 again.

When the relay reception unit 702 determines that the second request information is received from the first ECU 2 (YES in Step SF3), the relay transmission unit 701 stops transmission of the first time information J1 (Step SF4).

Then, the relay transmission unit 701 transmits, to the second ECU 9, the stop information to stop transmission of the second time information J3 (Step SF5).

Upon receiving the stop information, the second ECU 9 transmits the sensor data J2 without adding the second time information J3 or stops transmission of the second time information J3 and the sensor data J2. When the first time information J1 is received from the relay ECU 7 after receiving the stop information, the second ECU 9 transmits the sensor data J2 with the added second time information J3 to the relay ECU 7.

3. Third Embodiment

Next, a third embodiment will be described.

In the description of the third embodiment, same reference signs are applied to the structural elements that are same as those of each unit of the vehicle electronic system 1 according to the first embodiment, and detailed explanations thereof are omitted as appropriate.

In the third embodiment, the operations of the vehicle electronic system 1 related to time synchronization of the second ECU 9 differ from the case of the first embodiment.

FIG. 6 is a block diagram showing the configurations of the first ECU 2, the relay ECU 7, and the second ECU 9 according to the third embodiment.

Comparing FIG. 6 and FIG. 2, the relay processor 70 of the third embodiment further functions as a measurement unit 705.

The measurement unit 705 measures elapsed time. The elapsed time is the time elapsed from the start of generation of the first time information J1 till transmission of the first time information J1 generated. The measurement unit 705 measures the elapsed time by measurement means such as a counter, for example.

Next, operations of the vehicle electronic system 1 related to time synchronization will be described.

Figure 7:
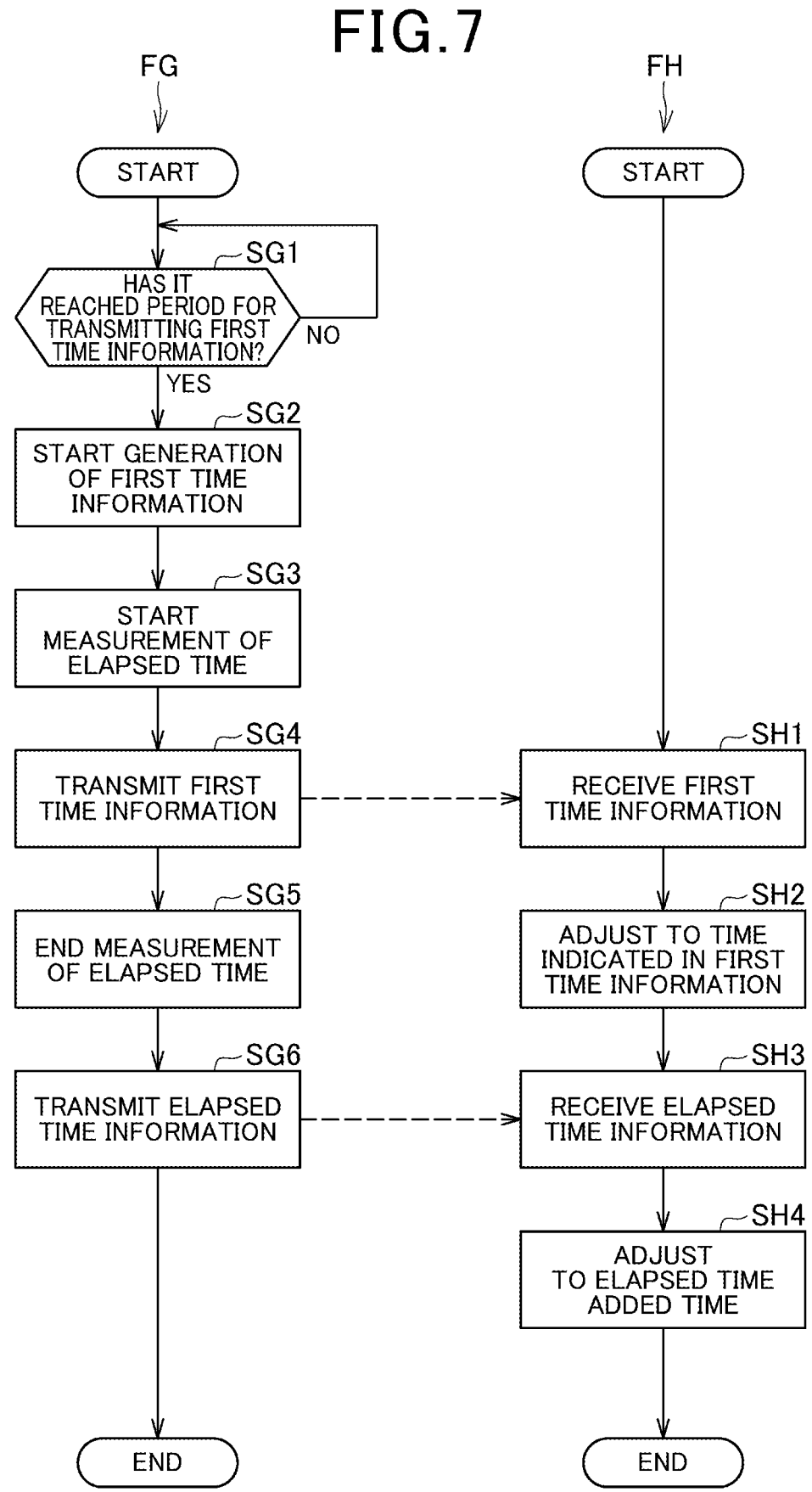
FIG. 7 is a flowchart showing the operations of the relay ECU and the second ECU.

FIG. 7 is a flowchart showing the operations of the relay ECU 7 and the second ECU 9. Operations shown in FIG. 7 are operations related to time synchronization. In FIG. 7, a flowchart FG indicates the operations of the relay ECU 7, and a flowchart FH indicates the operations of the second ECU 9.

As indicated in the flowchart FG, the generation unit 704 determines whether it has reached a period for transmitting the first time information J1 (Step SG1).

When determined that it has not reached the period for transmitting the first time information J1 (NO in Step SG1), the generation unit 704 performs determination of Step SG1 again.

In the meantime, when determined that it has reached the period for transmitting the first time information J1 (Yes in Step SG1), the generation unit 704 starts generation of the first time information J1 (Step SG2).

Then, the measurement unit 705 starts measurement of the elapsed time (Step SG3).

Thereafter, the relay transmission unit 701 transmits the first time information J1 generated by the generation unit 704 to the second ECU 9 (Step SG4).

Then, the measurement unit 705 ends the measurement of the elapsed time (Step SG5).

The relay transmission unit 701 then transmits, to the second ECU 9, elapsed time information J4 that indicates the elapsed time measured by the measurement unit 705 (Step SG6).

As indicated in the flowchart FH, the second reception unit 902 receives the first time information J1 from the relay ECU 7 (Step SH1).

Then, the second adjustment unit 904 adjusts the time counted by the second timer unit 903 to the time indicated in the first time information J1 received in Step SH1 (Step SH2). After the adjustment performed in Step SH2, the second timer unit 903 counts the time from the time indicated in the first time information J1 received in Step SH1 as the basis.

Then, the second reception unit 902 receives elapsed time information J4 from the relay ECU 7 (Step SH3).

Thereafter, the second adjustment unit 904 adjusts the time counted by the second timer unit 903 to elapsed time added time (Step SH4). Elapsed time added time is the time acquired by adding the elapsed time indicated in the elapsed time information J4 received in Step SH3 to the time that is counted by the second timer unit 903 from the time adjusted in Step SH2 as the basis.

Figure 8:
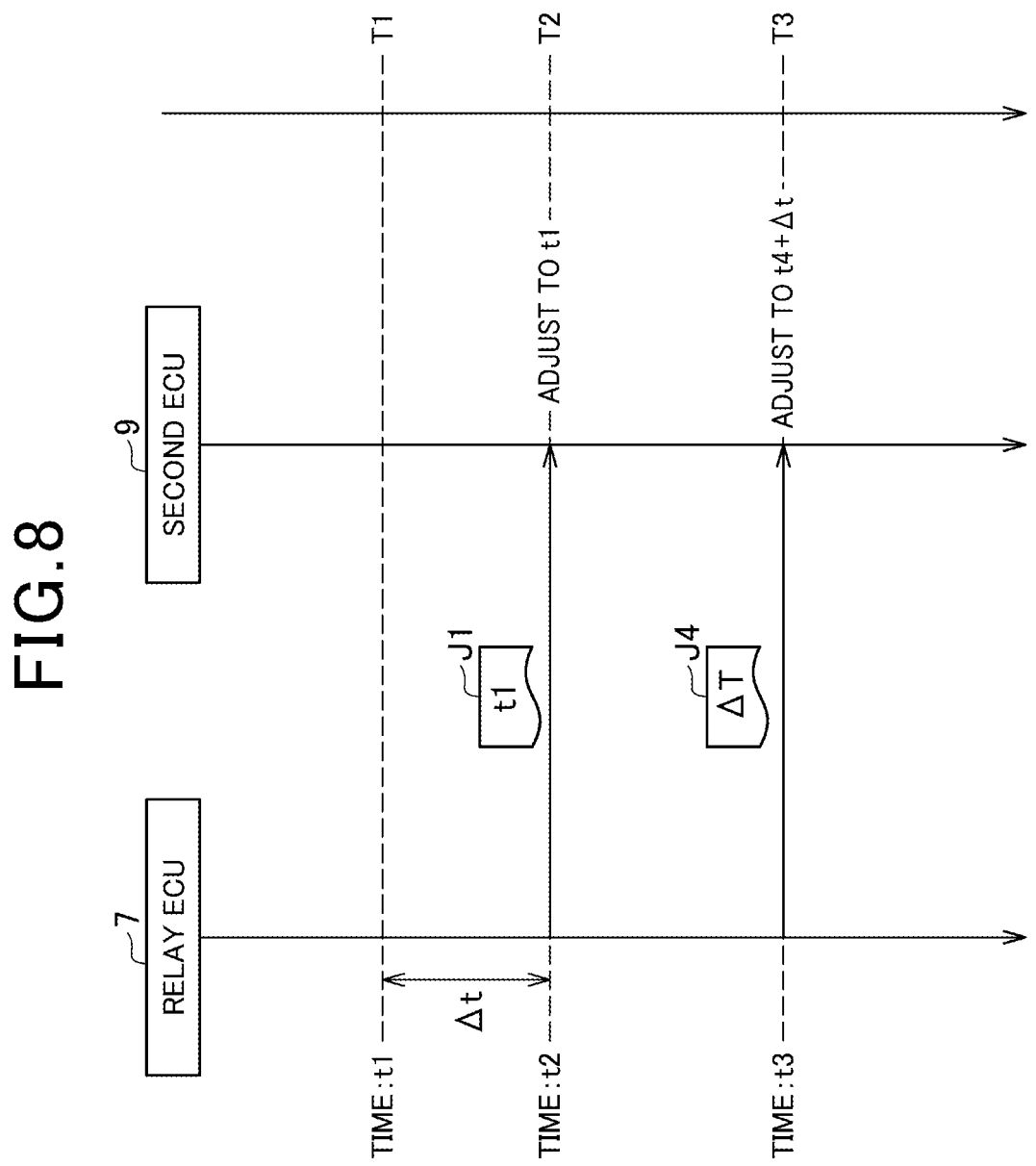
FIG. 8 is a diagram for describing time synchronization in a specific manner.

Referring to FIG. 8, time synchronization between the relay ECU 7 and the second ECU 9 will be described in a specific manner. FIG. 8 is a diagram for describing time synchronization in a specific manner.

At a timing T1, the generation unit 704 starts generation of the first time information J1. The timing T1 is the timing of a case where the time counted by the relay timer unit 703 is "t1".

At a timing T2, the relay transmission unit 701 transmits, to the second ECU 9, the first time information J1 that is started to be generated at the timing T1. The timing T2 is the timing of a case where the time counted by the relay timer unit 703 is "t2". The time "t2" is the time advanced by Δt from the time "t1". The first time information J1 transmitted at the timing T2 indicates "t1" that is the time at which generation is started.

When the second reception unit 902 receives the first time information J1 at the timing T2, the second adjustment unit 904 of the second ECU 9 adjusts the time counted by the second timer unit 903 to the time "t1" that is indicated in the first time information J1 received by the second reception unit 902. After the adjustment, the second timer unit 903 counts the time from the time "t1" as the basis.

At a timing T3, the generation unit 704 of the relay ECU 7 transmits the elapsed time information J4 to the second ECU 9. The timing T3 is the timing in a case where the time counted by the relay timer unit 703 is time "t3". The time "t3" is the timing advanced further from the time "t2". The elapsed time information J4 transmitted at the timing T3 indicates the elapsed time of "Δt". In FIG. 8, "Δt" is the elapsed time acquired by subtracting the time "t1" from the time "t2".

When the second reception unit 902 receives the elapsed time information J4 at the timing T3, the second adjustment unit 904 of the second ECU 9 adjusts the time counted by the second timer unit 903 to time "t4+Δt". The time "t4+Δt" is the elapsed time added time. The time "t4" indicates the time counted by the second timer unit 903 from the adjusted time "t1" as the basis to the timing T3.

4. Another Embodiment

Each of the embodiments described above merely indicates one aspect, and modification and application thereof are possible as desired.

As for the ECUs other than the relay ECU 7 connected to the first communication network 6 in the embodiments described above, there may be many ECUs other than the first ECU 2. Furthermore, as for the ECUs other than the relay ECU 7 connected to the second communication network 8 in the embodiments described above, there may be many ECUs other than the second ECU 9.

In the embodiments described above, the sensor data J2 is presented as an example of the data the second ECU 9 transmits by adding the second time information J3 thereto. However, the data the second ECU 9 transmits by adding the second time information J3 thereto is not limited to the sensor data J2 but may also be: data, information, and data indicating detection values output from the devices that are connected to the second ECU 9; data, information, and data indicating detection values related to the devices that are connected to the second ECU 9; data, information, and data indicating detection values related to the second ECU 9; or the like.

The first processor 20, the relay processor 70, and the second processor 90 may be configured with a plurality of processors or may be configured with a single processor. Those processors may also be hardware programmed to implement the above-described functional units. In that case, those processors may be configured with ASIC (Application Specific Integrated Circuit) or FPGA (Field Programmable Gate Array), for example.

Furthermore, the configurations of each of the units of the vehicle electronic system 1 shown in FIG. 2 and FIG. 6 are presented as an example only, and there is no specific limit set for the concrete implementation forms thereof. That is, hardware individually corresponding to each of the units does not necessarily need to be mounted, and it is certainly possible to implement functions of each of the units by executing a program by a single processor. Furthermore, part of the functions implemented by software in the embodiments described above may be configured with hardware, or part of the functions implemented by hardware may be implemented by software.

Furthermore, step units of the operations shown in FIG. 3, FIG. 4, and FIG. 7 are divided in accordance with the main processing contents, and the present disclosure is not limited by the manner the processing units are divided and the names thereof. The operations may be divided into a greater number of step units in accordance with the processing contents. Furthermore, a single step unit may be divided to include more processing. Moreover, the order of the steps may be changed as appropriate without departing from the scope of the present disclosure.

Furthermore, when a control method of the above-described vehicle electronic system 1 is to be implemented by using a processor, the program to be executed by the processor can be configured with a mode of recording medium or a mode of transmission medium that transmits the program. That is, the first control program 211 can also be implemented in a state where the first control program 211 is recorded on a removable information recording medium. While examples of the information recording medium may be a magnetic recording medium such as a hard disk, an optical recording medium such as a CD, and semiconductor memory devices such as a USB (Universal Serial Bus) memory and an SSD (Solid State Drive), it is also possible to use other recording media. Furthermore, as in the case of the first control program 211, the relay control program 711 can be implemented in a state where the relay control program 711 is recorded on a removable information recording medium. Moreover, as in the case of the first control program 211, the second control program 911 can be implemented in a state where the second control program 911 is recorded on a removable information recording medium.

5. Configuration Supported by the Embodiments

The above-described embodiments support the following configurations.

(Configuration 1) A vehicle electronic system including: a first electronic device connected to a first communication network of a first communication standard; a second electronic device connected to a second communication network of a second communication standard; and a relay device connected to the first communication network and the second communication network, in which the relay device includes a relay device transmission unit that transmits, to the second electronic device, first time information indicating time synchronized in the first communication network.

According to the vehicle electronic system of Configuration 1, the second electronic device can synchronize with the time indicated in the first time information, thereby making it possible to implement time synchronization between the first electronic device connected to the first communication network and the second electronic device connected to the second communication network. Therefore, time synchronization can be implemented between the electronic devices that are connected to the communication networks of different communication standards. Furthermore, according to the vehicle electronic system of Configuration 1, time synchronization between the first electronic device and the second electronic device can be implemented by transmitting the information from the relay device, so that no round-trip communication between the relay device and the second electronic device is necessary, thereby making it possible to decrease the communication traffic amount related to time synchronization.

(Configuration 2) The vehicle electronic system according to Configuration 1, in which the second electronic device includes: a second electronic device reception unit that receives the first time information; a second electronic device timer unit that counts time based on the first time information; and a second electronic device transmission unit that transmits data where second time information indicating time counted by the second electronic device timer unit is added.

According to the vehicle electronic system of Configuration 2, it is possible to add, to the data to be transmitted, the time information related to synchronization implemented between the electronic devices that are connected to the communication networks of different communication standards. Therefore, the data reception side can determine that the data to be transmitted is the data at what time. This makes it possible to transmit the data that can be easily used by the reception side of the data.

(Configuration 3) The vehicle electronic system according to Configuration 2, in which the relay device includes a relay device reception unit that receives request information for requesting provision of the second time information, and the relay device transmission unit transmits the first time information to the second electronic device, when the relay device reception unit receives the request information.

According to the vehicle electronic system of Configuration 3, the first time information is transmitted when it is necessary to provide the second time information, so that it is possible to suppress unnecessary communication between the relay device and the second electronic device. As a result, it is possible to decrease the communication traffic amount between the electronic devices in the vehicle electronic system.

(Configuration 4) The vehicle electronic system according to Configuration 2 or 3, in which the second electronic device transmission unit stops transmission of the second time information, when the second electronic device reception unit receives stop information for stopping transmission of the second time information.

According to the vehicle electronic system of Configuration 4 configured to be able to stop transmission of the second time information, it is possible to suppress unnecessary communication between the relay device and the second electronic device. As a result, it is possible to decrease the communication traffic amount between the electronic devices in the vehicle electronic system.

(Configuration 5) The vehicle electronic system according to any one of Configurations 1 to 4, in which the relay device transmission unit transmits, to the second electronic device, the first time information, and elapsed time information indicating elapsed time that is from start of generation of the first time information till transmission of the first time information generated.

According to the vehicle electronic system of Configuration 5, the time counted by the second electronic device can be adjusted by considering the elapsed time that is from the start of generation of the first time information till transmission of the first time information. Therefore, it is possible to implement time synchronization with high precision between the electronic devices that are connected to the communication networks of different communication standards.

(Configuration 6) The vehicle electronic system according to any one of Configurations 1 to 5, in which the first communication standard is Ethernet (registered trademark) standard, and the second communication standard is CAN standard.

According to the vehicle electronic system of Configuration 6, it is possible to implement time synchronization between the electronic device connected to the communication network of the Ethernet standard and the electronic device connected to communication network of the CAN standard. In addition, since time synchronization can be implemented between the electronic devices even when the communication network of the CAN standard is employed in the vehicle electronic system, it is possible to implement time synchronization between the electronic devices that are connected to the communication networks of different communication standard while achieving cost reduction of the vehicle electronic system.

(Configuration 7) The vehicle electronic system according to any one of Configurations 1 to 6, in which the first electronic device includes an absolute time reception unit that receives absolute time information indicating absolute time, and the time indicated in the first time information is the absolute time indicated in the absolute time information received by the absolute time reception unit.

According to the vehicle electronic system of Configuration 7, it is possible to adjust the time to be synchronized between the electronic devices that are connected to the communication networks of different communication standards.

(Configuration 8) A control method of a vehicle electronic system including a first electronic device connected to a first communication network of a first communication standard, a second electronic device connected to a second communication network of a second communication standard, and a relay device connected to the first communication network and the second communication network, the control method including: transmitting, by the relay device, to the second electronic device, first time information indicating time synchronized in the first communication network.

According to the control method of the vehicle electronic system of Configuration 8, the same effect as that of the vehicle electronic system of Configuration 1 can be achieved.

(Configuration 9) A relay device connected to a first communication network of a first communication standard where a first electronic device is connected, and a second communication network of a second communication standard where a second electronic device is connected, the relay device including: a relay device transmission unit that transmits, to the second electronic device, first time information indicating time synchronized in the first communication network.

According to the relay device of Configuration 9, the same effect as that of the vehicle electronic system of Configuration 1 can be achieved.

(Configuration 10) A non-transitory computer readable recording medium recording a program causing a processor of a relay device that is connected to a first communication network of a first communication standard where a first electronic device is connected, and a second communication network of a second communication standard where a second electronic device is connected, to function as: a relay device transmission unit that transmits, to the second electronic device, first time information indicating time synchronized in the first communication network.

According to the recording medium of Configuration 10, the same effect as that of the vehicle electronic system of Configuration 1 can be achieved.

REFERENCE SIGNS LIST

1 Vehicle electronic system
2 First ECU (first electronic device)
3 GNSS sensor
4 TCU
6 First communication network
7 Relay ECU (relay device)
8 Second communication network
9 Second ECU (second electronic device)
10 Sensor
20 First processor
21 First memory
22 First communication unit
70 Relay processor (processor)

71 Relay memory
72 Relay communication unit
90 Second processor
91 Second memory
92 Second communication unit
201 First communication unit
202 Second communication unit
203 Absolute time reception unit
204 First timer unit
205 First adjustment unit
211 First control program
701 Relay transmission unit (relay device transmission unit)
702 Relay reception unit (relay device reception unit)
703 Relay timer unit
704 Generation unit
705 Measurement unit
711 Relay control program (program)
901 Second transmission unit (second electronic device transmission unit)
902 Second reception unit (second electronic device reception unit)
903 Second timer unit (second electronic device timer unit)
904 Second adjustment unit
911 Second control program
J1 First time information
J2 Sensor data (data)
J3 Second time information
V Vehicle

What is claimed is:

1. A vehicle electronic system comprising:
a first electronic device connected to a first communication network of a first communication standard;
a second electronic device connected to a second communication network of a second communication standard; and
a relay device connected to the first communication network and the second communication network, wherein
the second electronic device comprises:
   a second electronic device reception unit that receives first time information indicating time synchronized in the first communication network;
   a second electronic device timer unit that counts time based on the first time information; and
   a second electronic device transmission unit that transmits data where second time information indicating time counted by the second electronic device timer unit is added,
the relay device comprises:
   a relay device transmission unit that transmits, to the second electronic device, the first time information; and
   a relay device reception unit that receives request information for requesting provision of the second time information, and
the relay device transmission unit transmits the first time information to the second electronic device, when the relay device reception unit receives the request information.

2. The vehicle electronic system according to claim 1, wherein the second electronic device transmission unit stops transmission of the second time information, when the second electronic device reception unit receives stop information for stopping transmission of the second time information.

3. The vehicle electronic system according to claim 1, wherein the relay device transmission unit transmits, to the second electronic device, the first time information, and elapsed time information indicating elapsed time that is from start of generation of the first time information till transmission of the first time information generated.

4. The vehicle electronic system according to claim 1, wherein
the first communication standard is Ethernet (registered trademark) standard, and
the second communication standard is CAN standard.

5. The vehicle electronic system according to claim 1, wherein
the first electronic device comprises an absolute time reception unit that receives absolute time information indicating absolute time, and
the time indicated in the first time information is the absolute time indicated in the absolute time information received by the absolute time reception unit.

6. A control method of a vehicle electronic system comprising a first electronic device connected to a first communication network of a first communication standard, a second electronic device connected to a second communication network of a second communication standard, and a relay device connected to the first communication network and the second communication network, the control method comprising:
by the second electronic device,
   receiving first time information indicating time synchronized in the first communication network;
   counting time based on the first time information; and
   transmitting data where second time information indicating time counted by a second electronic device timer unit, of the second electronic device, is added; and
by the relay device,
   receiving request information for requesting provision of the second time information; and
   transmitting to the second electronic device, the first time information when receiving the request information.

7. A relay device connected to a first communication network of a first communication standard where a first electronic device is connected, and a second communication network of a second communication standard where a second electronic device is connected, the relay device comprising:
a relay device transmission unit that transmits, to the second electronic device, first time information indicating time synchronized in the first communication network; and
a relay device reception unit that receives request information for requesting provision of second time information indicating time counted by the second electronic device based on the first time information,
wherein the relay device transmission unit transmits the first time information to the second electronic device, when the relay device reception unit receives the request information.

8. A non-transitory computer readable recording medium recording a program causing a processor of a relay device that is connected to a first communication network of a first communication standard where a first electronic device is connected, and a second communication network of a second communication standard where a second electronic device is connected, to function as:

a relay device transmission unit that transmits, to the second electronic device, first time information indicating time synchronized in the first communication network; and a relay device reception unit that receives request information for requesting provision of second time information indicating time counted by the second electronic device based on the first time information, wherein the relay device transmission unit transmits the first time information to the second electronic device, when the relay device reception unit receives the request information.

9. A vehicle electronic system comprising:

a first electronic device connected to a first communication network of a first communication standard;

a second electronic device connected to a second communication network of a second communication standard; and a relay device connected to the first communication network and the second communication network, wherein the second electronic device comprises:

a second electronic device reception unit that receives first time information indicating time synchronized in the first communication network;

a second electronic device timer unit that counts time based on the first time information; and a second electronic device transmission unit that transmits data where second time information indicating time counted by the second electronic device timer unit is added, the relay device comprises a relay device transmission unit that transmits, to the second electronic device, the first time information, and the second electronic device transmission unit stops transmission of the second time information, when the second electronic device reception unit receives stop information for stopping transmission of the second time information.

* * * * *